April 22, 1924.
J. H. HAMMOND, JR
1,491,773
METHOD OF AND SYSTEM FOR SELECTIVE WAVE TRANSMISSION
Original Filed May 9, 1912
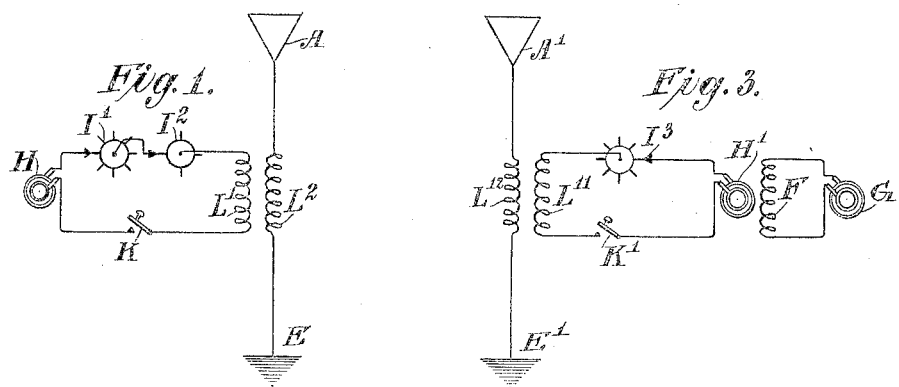
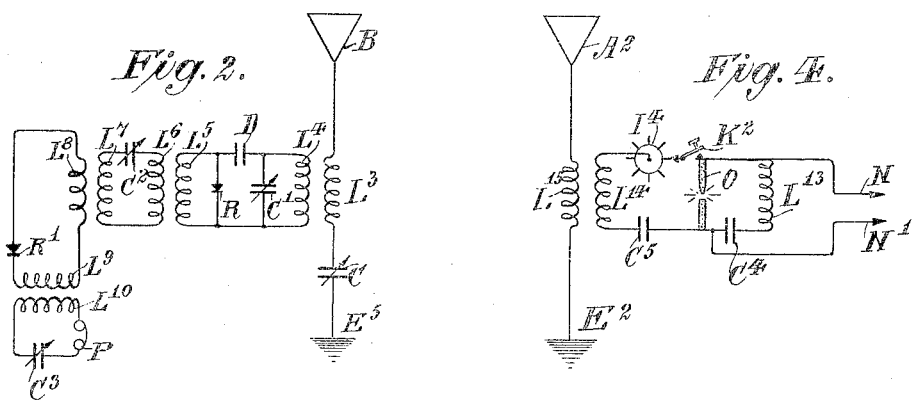
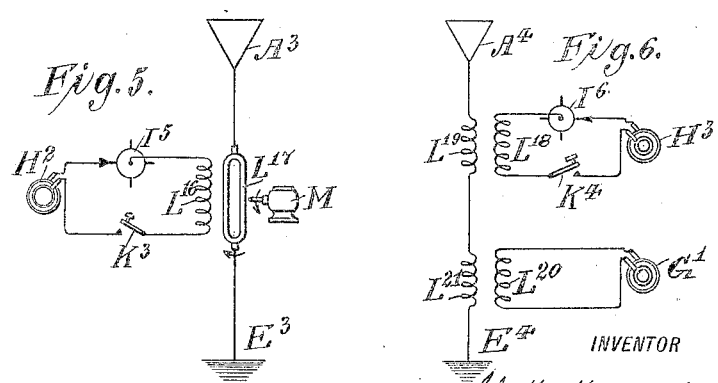
WITNESSES
INVENTOR
ATTORNEYS Patented Apr. 22, 1924.

1,491,773

UNITED STATES PATENT OFFICE.

JOHN HAYS HAMMOND, JR., OF GLOUCESTER, MASSACHUSETTS.

METHOD OF AND SYSTEM FOR SELECTIVE WAVE TRANSMISSION.

Application filed May 9, 1912, Serial No. 696,113. Renewed December 19, 1919. Serial No. 346,169.

*To all whom it may concern:*

Be it known that I, JOHN HAYS HAMMOND, Jr., a citizen of the United States, residing at Gloucester, in the State of Massachusetts, have invented certain new and useful Improvements in Methods of and Systems for Selective Wave Transmission, of which the following is a specification.

My invention relates to improvements in methods of and systems for the transmission of energy by means of Hertzian or electro-radiant waves, and relates more particularly to systems wherein selectivity in transmission is secured by employing distinctive wave lengths and distinctive wave-group frequencies. In the system of this invention, I secure a still higher degree of selectivity by transmitting and receiving these waves and wave-groups at a third distinctive rate, which may be obtained by means of interrupters, variations of wave amplitude or in other ways, as is hereinafter more fully set forth and described.

In the accompanying drawings,—

Figure 1 shows, in diagrammatic form, a transmitting station containing a high-frequency alternator and two interrupters having different frequencies.

Figure 2 shows, in diagrammatic form, a receiving station having circuits responsive to three different frequencies of waves and wave groups.

Figure 3 shows, in diagrammatic form, a transmitting station having a medium-frequency alternator, a high-frequency alternator and an interrupter.

Figure 4 shows, in diagrammatic form, a transmitting station in which an electric arc is employed as the source of the electric oscillations.

Figure 5 shows, in diagrammatic form, a transmitting station having a high-frequency alternator, an interrupter and a motor-operated coil for varying the amplitude of the electric waves.

Figure 6 shows, in diagrammatic form, a transmitting station having a high-frequency alternator and an interrupter in one circuit and a medium-frequency alternator in another circuit, both circuits being in inductive relation to the antenna.

In Figure 1, the high-frequency alternator H supplies energy to the coil $L^1$ through the interrupters $I^1$ and $I^2$ and the key K. The coil $L^1$ is in inductive relation with a coil $L^2$, which is connected with an antenna A grounded at E, so that all the oscillations and wave variations occurring in coil $L^1$ will be impressed upon the antenna A and radiated therefrom.

If we assume that the inertia of the circuits at the receiving station is such as to require twenty impressed oscillations to swing them up to full amplitude, then the ratio of the different frequencies at the transmitter should be 20 to 1. In other words, the frequencies of the waves and wave groups emitted by the transmitter should have values which diminish, or increase, in steps bearing a ratio of 20 to 1 to each other. If, for instance, the oscillation frequency of the high-frequency alternator be 300,000 per second, corresponding to a wave length of about 1000 meters, the first interrupter $I^1$, which breaks these waves up into a primary series of groups, should have a frequency of 15,000 per second, and the second interrupter $I^2$, which divides these wave groups into a second series of groups or sets, should have a frequency of 750 per second. Each group or set of the second series will contain 20 groups of the first series, and each group of the first series will contain twenty waves. These waves and wave groups will then be radiated all together from the antenna.

This ratio of 20 to 1 between the waves and wave groups is merely cited as an example, and any other suitable ratio may be employed. Nor is it essential that the ratio between the wave frequency and the first group frequency be the same as that between the first group frequency and the second group frequency, but any suitable ratios to fit a particular case may be used. It is advisable that the first group frequency should be above the limits of audibility, so that a station attempting to interfere would have difficulty in determining its value, but this is not essential, except when this system is used for radio telephony.

In Figure 2, the receiving antenna circuit, B $L^3$ C $E^5$, consisting of the antenna B, the coil $L^3$, the variable condenser C and the ground $E^5$ is tuned to the wave frequency of waves radiated from the transmitting station, and is coupled by means of the coils $L^3$ and $L^4$ with the oscillation circuit $L^4$ $C^1$ containing the variable condenser $C^1$. The oscillation circuit $L^4$ $C^1$ is also in tune with the wave frequency of the transmitting station. By means of the stopping condenser D and the rectifier R, the coil $L^5$ receives unidirectional current from the circuit $L^4$ $C^1$, these impulses having a frequency equal to that of the first series of wave groups of the transmitting station. The coil $L^5$, being in inductive relation to coil $L^6$, energizes the circuit, $L^6$ $C^2$ $L^7$, which contains the variable condenser $C^2$ and is in resonance with the said first group frequency of the transmitter. By means of the coupling coils $L^7$ and $L^8$, oscillations are impressed upon the untuned circuit, $L^8$ $R^1$ $L^9$, and are converted by the rectifier $R^1$ into undirectional impulses which have the same frequency as the second series of wave groups of the transmitter. The circuit, $L^{10}$ $C^3$ P, which is inductively connected with coil $L^9$, is in resonance with this second group frequency, and when the transmitting station is in operation the current impulses corresponding to the second group frequency will actuate the telephone receiver P and signals will be heard.

In Figure 3, G is an alternating current generator having a frequency of, for example, 7,500 cycles per second. The current from the generator G excites the field winding of the high-frequency alternator $H^1$, and so impresses a series of amplitude variations on the current of the generator $H^1$ corresponding to a frequency of 15,000. The generator itself has a frequency in this case of 300,000 cycles per second, and delivers its current through the interrupter $I^3$ and the key $K^1$ to the coil $L^{11}$, and thence by means of the coupling coil $L^{12}$ to the antenna $A^1$, which is preferably grounded as indicated at $E^1$. If it is desired that the frequency of the series of amplitude variations should bear a ratio of 20 to 1 to the interrupter frequency, then the interrupter $I^3$ should have a frequency of 750 per second. In this arrangement of apparatus, the alternator G, by its periodic amplitude variation of the high-frequency current, produces the intermediate transmission frequency, and thus takes the place of the interrupter $I^1$ of Figure 1.

In Figure 4, an arc oscillatory current generator O is fed from a source of direct current N $N^1$. In a shunt circuit around the arc O are a condenser $C^5$, an inductance coil $L^{14}$, an interrupter $I^4$, and a key $K^2$, and in another shunt circuit about the arc are a condenser $C^4$ and an inductance coil $L^{13}$. If the interrupter $I^4$ and the key $K^2$ are closed, then, as is well known in the art, when the parts O, $C^5$ and $L^{14}$ are properly adjusted, oscillatory currents will be generated in circuit O $C^5$ $L^{14}$ $I^4$ $K^2$, the frequency of which will be dependent upon the values of the condenser $C^5$ and coil $L^{14}$. Let this circuit be so adjusted that the frequency of these oscillations will be 300,000 per second. In a similar manner the circuit, O $C^4$ $L^{13}$, may be so adjusted that oscillations will be generated in it having a frequency of 7,500 cycles per second, and these oscillations will therefore produce a series of amplitude variations in the current in circuit, O $C^5$ $L^{14}$ $I^4$ $K^2$, having a frequency of 15,000 per second.

If the interrupter $I^4$ have a frequency of 750 per second, then there will be impressed upon the antenna $A^2$, by means of the coupling coil $L^{15}$, electric oscillations having a frequency of 300,000, with amplitude variations of a frequency of 15,000, in groups having a frequency of 750 per second, and these waves and wave groups will be radiated from the antenna $A^2$, which is preferably grounded as indicated at $E^2$.

In Figure 5, $H^2$ is a high-frequency alternator supplying current to the antenna $A^3$ through the interrupter $I^5$, key $K^3$ and coupling coils $L^{16}$ and $L^{17}$. A motor M is mechanically connected to the coil $L^{17}$ so as to rotate it in such a way as to produce a series of periodic amplitude variations, the frequency of which is preferably above the limit of audibility, in the current impressed upon the antenna $A^3$. The frequency of the amplitude variations should be intermediate between the frequency of the alternator $H^2$ and the frequency of the interrupter $I^5$. The antenna $A^3$ is grounded at $E^3$.

In Figure 6, the high-frequency alternator $H^3$ induces oscillatory currents in the antenna $A^4$ through the interrupter $I^6$, the key $K^4$ and the coupling coils $L^{18}$ and $L^{19}$; and the alternator $G^1$, with a frequency intermediate between the frequency of the alternator $H^3$ and the frequency of the interrupter $I^6$, and preferably above the limits of audibility, impresses variations of amplitude upon the oscillatory currents in the antenna $A^4$ by means of the coupling coils $L^{20}$ and $L^{21}$. The antenna $A^4$ is grounded at $E^4$.

In all of these examples, the absolute frequencies and the relations between the frequencies may be of any values suitable for each case, and this invention is not limited to any particular frequencies. Nor is this invention limited to the special apparatus herein described, but any suitable means may be employed for producing the waves and wave groups or variations of wave amplitude transmitted, such, for example, as those described in my application for U. S. Letters Patent, Serial No. 693,380, filed April 26th, 1912.

It is also evident that by adding one or more interrupters of different frequencies to my apparatus, or by providing other suitable means for increasing the number of different frequencies of the wave groups, I may employ four or more different wave and wave-group frequencies or variations of wave amplitude in one set, and so make my system additionally selective.

Having thus described my invention, what I claim is:

1. In a transmission system, the combination with means for producing periodic impulses of a predetermined frequency, of means acting inductively upon said impulses to impress thereon periodic variations having a frequency different from said first mentioned frequency, and means automatically operative to modify said impulses periodically at a frequency different from said first mentioned frequencies.

2. In a radio transmission system, the combination with means for producing radiant impulses of a predetermined frequency, of means acting inductively upon said impulses to impress thereon periodic variations having a frequency different from said first mentioned frequency, and means automatically operative to modify said impulses periodically at a frequency different from said first mentioned frequencies.

3. The method of transmitting energy which consists in transmitting a series of periodic impulses in periodic sets of periodic groups and maintaining a substantially equal ratio between the frequency of said impulses and the frequency of said groups, and the frequency of said groups and the frequency of said sets.

4. The method of transmitting radiant energy which consists in transmitting a series of periodic sets of periodic groups of periodic radiant impulses and maintaining a substantially equal ratio between the frequency of said sets and the frequency of said groups and between the frequency of said groups and the frequency of said impulses.

5. The combination with means for transmitting a series of periodic sets of periodic groups of periodic impulses, of means for receiving said sets of groups of impulses, including three co-acting elements tuned to the frequency of said impulses, the frequency of said groups, and the frequency of said sets, respectively, the ratio between the frequency of said impulses and the frequency of said groups being substantially equal to the ratio between the frequency of said groups and the frequency of said sets.

6. The combination with means for transmitting a series of periodic sets of periodic groups of periodic impulses, of means for receiving said sets of groups of impulses, including three co-acting elements tuned to the frequency of said impulses, the frequency of said groups, and the frequency of said sets, respectively, the ratio between the frequency of said impulses and the frequency of said groups being substantially equal to the ratio between the frequency of said groups and the frequency of said sets, and the number of said impulses in one of said groups being substantially just sufficient to swing the corresponding receiving element up to full amplitude.

7. A transmission system comprising a source of periodic electrical alternations comprising a field winding, for producing electrical impulses, means including a source of alternating current arranged to excite said field winding to produce in said impulses periodic amplitude variations, and means energized by said impulses for producing electro-radiant impulses.

8. A transmission system comprising a source of periodic electrical alternations comprising a field winding, for producing electrical impulses, means including a source of alternating current arranged to excite said field winding to produce in said impulses periodic amplitude variations, means energized by said impulses for producing electro-radiant impulses and means automatically operative to interrupt said electrical impulses periodically.

9. In a transmission system, the combination with means for producing periodic impulses of a predetermined high frequency, of means acting inductively upon said impulses to impress thereon periodic variations having a frequency lower than said first-mentioned frequency but above audibility, and means automatically operative to modify said impulses periodically at a frequency lower than said first-mentioned frequencies.

10. In a radio transmission system, the combination with means for producing radiant impulses of a predetermined frequency, of means acting inductively upon said impulses to impress thereon periodic variations having a frequency lower than said first-mentioned frequency but above audibility, and means automatically operative to modify said impulses periodically at a frequency lower than said first-mentioned frequencies and within the range of audibility.

11. A transmission system comprising a source of periodic electrical alternations comprising a field winding, for producing electrical impulses, means including a source of alternating current arranged to excite said field winding to produce in said impulses periodic amplitude variations having a frequency above audibility, means energized by said impulses for producing electro-radiant impulses and means automatically operative to interrupt said electrical impulses periodically at an audio frequency.

This specification signed and witnessed this 4th day of May, A. D., 1912.

JOHN HAYS HAMMOND, Jr.

Signed in the presence of—
  M. P. WINNE,
  BENJ. F. MIESSNER.